United States Patent Office 3,341,291
Patented Sept. 12, 1967

3,341,291
PRODUCTION OF TITANIUM DIOXIDE
Frank Edward Mabbs, Redcar, and Brian Barnard, Nunthorpe, Middlesbrough, England, assignors to British Titan Products Company Limited, Durham, England, a corporation of the United Kingdom
No Drawing. Filed Aug. 31, 1964, Ser. No. 393,425
Claims priority, application Great Britain, Oct. 4, 1963, 39,114/63
14 Claims. (Cl. 23—202)

ABSTRACT OF THE DISCLOSURE

In producing pigmentary titanium dioxide by the normal sulfate process, objectionable quantities of iron, chromium, vanadium and/or niobium impurities are carried over into the final product. By effecting precipitation of the titanium values from sulfuric acid solution in the form of a titanyl sulfate slurry or discrete titanyl sulfate particles, and separating and redissolving the titanyl sulfate in an aqueous liquid, a solution is provided from which hydrous titanium dioxide can be precipitated by hydrolysis with increased purity of product. Precipitation of titanyl sulfate as a solid mass is avoided by adding sulfuric acid to the titanyl sulfate solution shortly after initiation of precipitation.

---

The present invention relates to a process for the production of pigmentary titanium dioxide.

Pigmentary titanium dioxide is commonly made by the sulfate process wherein an impure iron-containing titaniferous material, for example ilmenite, is digested with a limited amount of hot concentrated sulfuric acid and the resulting solid is then dissolved, normally in water or dilute sulfuric acid. The solution thus formed is then subjected to various treatments such as reduction of the iron content to the ferrous state; removal of undissolved solids by clarification and of some of the dissolved iron, for example by concentration and cooling. Ultimately a substantially clear solution is obtained having acceptable iron/titanium and acid/titanium ratios. To this solution are added or are formed in situ, rutile- or anatase-inducing nuclei and the resulting mixture is heated to hydrolyze the titanium sulfate in solution and to precipitate hydrous titanium dioxide.

The latter is filtered off and subjected to various washing procedures to remove excess acid and various color-forming impurities such as iron or chromium compounds.

To the purified hydrous titanium hydroxide are added various conditioning agents, for example compounds of zinc, antimony or tin, if rutile titanium dioxide is to be produced and heat-decomposable alkali metal salts or phosphates (e.g. as the ammonium salt).

The titanium dioxide is then calcined, for example at a temperature in the range of about 800 to 1100° C., wet and/or dry milled, classified following which it may be coated, dried and finally milled. It may also be coated with hydrous oxides or other metals or metalloids, for example of aluminum, titanium, silicon, zirconium and/or cerium at some stage before recovery.

Titanium dioxide pigment produced by the above process frequently contains coloring impurities which prevent the development of the maximum brightness of which titanium dioxide pigments are capable. It is believed that this inferior brightness is due, at least in part, to the presence of small amounts of elements such as chromium, vanadium, niobium and/or iron in the pigment derived from impurities in the iron-containing titaniferous material. It has proved impossible to remove all the coloring impurities and to develop maximum brightness by usual washing techniques.

It is an object of the present invention to provide a process for the production of titanium dioxide pigments of higher purity than previously obtained by the sulfate process.

Accordingly, the present invention is a process for the production of titanium dioxide pigments comprising dissolving titanium dioxide in sulfuric acid; heating the resulting solution until precipitation of titanyl sulfate begins, thereafter adding aqueous sulfuric acid; separating precipitated titanyl sulfate from the mother liquor and redissolving it in aqueous liquid; hydrolyzing the solution so obtained and thereafter recovering and calcining the hydrous titanium dioxide thus formed.

The titanium dioxide which is dissolved in sulfuric acid may be from any source but it is preferred to use hydrous titanium dioxide which has been obtained either (a) from the hydrolysis step of the normal sulfate process (as previously described) and before additioning and calcining, or (b), from the hydrolysis of the impure solution obtained by dissolving the solid left after digesting an iron-containing titaniferous material in sulfuric acid (as previously described). Where the latter material is used the hydrolysis is preferably carried out at a lower temperature than is usual in the normal sulfate process. The hydrous titanium dioxide, produced by hydrolysis is recovered, for example by filtration or by settling and it may be washed, if desired, to remove readily water-soluble impurities.

Where the titanium dioxide is hydrous titanium dioxide derived from the normal hydrolysis step of the sulfate process it should be preferably be that obtained from hydrolysis conditions appropriate to the formation of anatase titanium dioxide rather than rutile.

The titanium dioxide is then dissolved in sulfuric acid. A convenient method of doing this is to slurry it with a limited amount of water, for example from about ⅓ to ⅙ times the weight of titanium dioxide and to add concentrated sulfuric acid.

It is preferred to add sufficient acid to give an acid/titanium dioxide ratio in the mixture between about 1.5 and 5, particularly one in the range 1.5 to 3.0.

To assist in dissolving the titanium dioxide the mixture is generally heated, for example to a temperature in the range 60° C. to the boiling point of the mixture.

When the solution of the titanium dioxide is complete the liquid is preferably diluted to an acid content in the range 550 to 750 g./liter, particularly 650 to 700 g./liter and filtered to remove undissolved solid.

Titanyl sulfate (believed to have the formula $$TiOSO_4 \cdot 2H_2O)$$

is conveniently precipitated from the solution by heating the solution and by seeding the solution with crystals of titanyl sulfate obtained from previous batches.

The solution is conveniently heated to a temperature in the range 60° C. to the boiling point, preferably at or near the boiling point to precipitate titanyl sulfate.

If the heating of the solution to precipitate titanyl sulfate is continued until essentially all the titanyl sulfate is precipitated a solid mass is formed which is very difficult to handle in order to purify. In order to avoid this difficulty heating is stopped after precipitation of titanyl sulfate has commenced and aqueous sulfuric acid added to the mixture. By this means the precipitate is formed as a slurry in high yield which can be readily recovered and purified. The resulting mixture is conveniently kept at a temperature in the range of about 20° C. to 120° C., particularly 60 C. to 90 C., for a period of about 4 to 6 hours to allow precipitation to go to completion.

The aqueous sulfuric acid added after precipitation of titanyl sulfate has commenced may be of any convenient strength but is preferably of 40% to 60%, preferably 45% to 55% weight percent concentration and an amount of about one tenth to four times, of the original mixture is conveniently added, preferably one to two times.

An amount of titanyl sulfate crystals up to about 10% by weight (based on the amount of titanium (as TiO$_2$) in solution) may be used for seeding the solution, if desired.

When precipitation of titanyl sulfate is complete the crystals are separated from the mother liquor by any suitable means, for example by filtration or by the use of a centrifuge, and they are preferably washed, for example with acetone or aqueous sulfuric acid (e.g. of about 50% concentration) followed by a final wash with dilute aqueous sulfuric acid (e.g. about 10%).

The titanyl sulfate crystals are then dissolved in water and, if desired, the solution may be filtered if any undissolved material remains.

It is desirable before hydrolysis of the solution to adjust the acid/titanium (as TiO$_2$) ratio of the solution to a value in the range 1.5 to 2.5, particularly to a value in the range 1.7 to 2.0 by the addition of sulfuric acid to the solution.

It may also be advantageous before hydrolysis to reduce a small amount of the titanium in solution to the trivalent state, for example by the addition of an appropriate amount of zinc. An amount of trivalent titanium in the range 0.3 to 2.0 g./liter has been found satisfactory.

Before hydrolysis the solution is preferably concentrated until it contains a concentration of titanium (as TiO$_2$) in the range of about 150 to 375 g./liter, particularly a concentration in the range 250 to 350 g./liter. The concentration is suitably carried out at low temperature (e.g. room temperature) under reduced pressure to avoid premature hydrolysis.

The solution is then nucleated before hydrolysis. The type of nuclei which are added will be anatase- or rutile-inducing depending upon the desired form of the final product.

The production of anatase- or rutile-inducing nuclei and use of such nuclei are widely practiced in the titanium dioxide industry and such nuclei and methods for their use may be used in the process of the present invention.

After the addition of the appropriate nuclei the solution is normally heated to hydrolyze the titanyl sulfate and precipitate hydrous titanium dioxide. Heating to a temperature of at least 70° C. and particularly to a temperature in the range 90° C. to the boiling point of the solution is preferred. Heating may be continued until there is no further precipitation of hydrous titanium dioxide. Alternatively, the mixture may be heated, diluted and reheated, if desired.

The precipitated hydrous titanium dioxide is then recovered, for example by settling or by filtration, and well washed before making the desired precalcination additions, for example compounds of zinc, antimony or tin to assist in rutilization or alkali metal (e.g. potassium) and/or phosphate compounds to assist in modifying the properties of the final pigment.

After calcination, for example at a temperature in the range of about 700° C. to 1100° C. and particularly in the range 750 to 900° C. the product may be subjected to known treatments such as wet and dry milling (including sand milling and/or fluid energy milling), hydroclassifying, coating with hydrous metal oxides and drying, to obtain titanium dioxide particles of optimum pigmentary size.

The following examples show various embodiments of the present invention.

*Example 1*

Hydrous anatase titanium dioxide pulp (containing 33.6% TiO$_2$) obtained from the precipitation stage of a normal sulfate process was slurried with about one fifth of its weight of water and sufficient 98% sulfuric acid added to give an acid/titanium ratio of 3:0. The addition of the acid raised the temperature of the mixture and external heat was applied to bring the mixture to the boil and to maintain it at that temperature until substantially all the titanium dioxide had dissolved.

The solution was then cooled to about 50° C. and diluted with water to give a solution containing 200 g./liter TiO$_2$ which was filtered to remove any undissolved solids.

Titanyl sulfate was precipitated from this solution by seeding with titanyl sulfate crystals (5% on the TiO$_2$ in solution); boiling for 15 minutes to induce crystallization and thereafter adding 1½ volumes of 50% aqueous sulfuric acid. The mixture was then stored for 5 hours at 80° C.

The titanyl sulfate was precipitated in high yield (in excess of 90%) as a thick slurry which filtered readily and could be easily washed on the filter with 10% aqueous sulfuric acid.

The washed titanyl sulfate was dissolved in water to give a solution containing about 170 g./liter TiO$_2$ and an acid/titanium dioxide ratio of about 1.96. The solution was filtered and sufficient zinc dust added to produce about 0.5 g./liter trivalent titanium after which the solution was concentrated under reduced pressure to 300 g./liter TiO$_2$. The temperature was raised to 95° C. and 1.8% rutile-inducing nuclei were added after which the mixture was boiled for 3½ hours.

The precipitated hydrous titanium dioxide pulp was filtered off, washed with water, additioned with 0.5% K$_2$SO$_4$, 0.25% ZnO and sufficient ammonium phosphate to provide 0.25% P$_2$O$_5$. The product was calcined at 820° C. to give a pigment of excellent brightness containing 98.7% rutile and having the following analysis.

| | |
|---|---|
| Fe (p.p.m.) | 6 |
| Cr$_2$O$_3$ (p.p.m.) | 1.4 |
| V$_2$O$_5$ (p.p.m.) | 1.4 |
| Nb$_2$O$_5$ (percent) | 0.07 |

A typical pigment obtained by the normal sulfate route had the following analysis.

| | |
|---|---|
| Fe (p.p.m.) | 38 |
| Cr$_2$O$_3$ (p.p.m.) | 3.5 |
| V$_2$O$_5$ (p.p.m.) | 9 |
| Nb$_2$O$_5$ (percent) | 0.15 |

The product produced according to the invention in Example 1 was compared visually for brightness with (a) "Analar" magnesium oxide and (b) a titanium dioxide rutile pigment produced by the normal sulfate process and similarly treated. The results were expressed on an arbitrary scale to which the value 0 (the highest value) is given to magnesium oxide and the following values for the other pigments tested.

On this scale the following results were obtained:

| | |
|---|---|
| Magnesium oxide | 0 |
| Rutile titanium dioxide pigment by normal sulfate process | 10 |
| Titanium dioxide as produced in Example 1 | 4 |

*Example 2*

The process described above was carried out using hydrous titanium dioxide derived from the normal sulfate process precipitation stage after the digestion of two different iron-containing titaniferous materials (ilmenites) from that used in Example 1 and from the digestion of a titaniferous slag (produced by removing some iron from an ilmenite ore after smelting the ore in an electric furnace).

The ores and the slag were also subjected to the normal sulfate process to give rutile titanium dioxide pigments. The iron, chromium, vanadium and niobium content of the pigments produced by the process of the present invention and by the normal sulfate process were estimated and are given in the table below.

|  |  | Fe (p.p.m.) | $Cr_2O_3$ (p.p.m.) | $V_2O_5$ (p.p.m.) | $Nb_2O_5$ (percent) |
|---|---|---|---|---|---|
| Ore 1 | Produced by present process | 4 | 1 | 1 | 0.1 |
|  | Normal sulfate process | 30 | 5 | 10 | 0.34 |
| Ore 2 | Produced by present process | 6 | 1 | 1 | 0.06 |
|  | Normal sulfate process | 40 | 3.5 | 9 | 0.15 |
| Slag | Produced by present process | 7 | 1.5 | 1.5 | 0.02 |
|  | Normal sulfate process | 40 | 2.5 | 8.5 | 0.02 |

When the products of the present invention in Example 2 were compared visually for brightness with pigment produced from the same starting material by the normal sulfate process by the method described in Example 1 differences in brightness between the two products was similar to that given in Example 1.

*Example 3*

The same iron-containing titaniferous ore used in Example 1 to produce the hydrous titanium dioxide by the normal sulfate process to precipitation was digested in sulfuric acid and the solid cake thus produced was dissolved in dilute sulfuric acid as in the normal sulfate process. The undissolved solids were allowed to settle out and the clear supernatant liquor was separated from the solids and boiled to precipitate hydrous titanium dioxide without the removal of any more impurities. The hydrous titanium dioxide was recovered and treated as described in Example 1.

The pigment produced by the above process was analyzed for iron, chromium, vanadium and niobium and the results are given below.

Fe (p.p.m.) _____ 7
$Cr_2O_3$ (p.p.m.) _____ 1.5
$V_2O_5$ (p.p.m.) _____ 1.5
$Nb_2O_5$ (percent) _____ 0.07

*Example 4*

The process described in Example 1 was carried out but no aqueous sulfuric acid was added after the addition of titanyl sulfate seeding crystals and subsequent boiling to precipitate titanyl sulfate. Thus the process was not carried out according to the present invention.

The titanyl sulfate precipitated out as a hard crystalline mass which was exceedingly difficult to recover and handle.

What is claimed is:

1. In the process for producing titanium dioxide from oxidic titaniferous materials contaminated by at least one material of the group consisting of chromium, vanadium, niobium and iron impurities, which process comprises the steps of
    (a) dissolving said oxidic titaniferous material in aqueous sulfuric acid to form an aqueous solution of titanyl sulfate;
    (b) hydrolyzing said titanyl sulfate solution to form hydrous titanium dioxide; and
    (c) recovering and calcining said hydrous titanium dioxide, the improvement for substantially reducing the amount of said contamination carried over into the final product which comprises the additional steps of
        (i) heating said solution from step (a) to a temperature and for a time sufficient to initiate precipitation of titanyl sulfate;
        (ii) adding aqueous sulfuric acid to the heated solution from step (i) after commencement of precipitation of titanyl sulfate but prior to the completion thereof to provide an aqueous acidic slurry of precipitated titanyl sulfate;
        (iii) separating the precipitated titanyl sulfate from the mother liquor after the completion of said precipitation;
        (iv) redissolving the precipitated titanyl sulfate from step (iii) in aqueous liquid to provide a fresh aqueous solution of titanyl sulfate of substantially reduced contamination; and
        (v) employing said titanyl sulfate solution of step (iv) in hydrolysis step (b).

2. A process in accordance with claim 1 wherein the oxidic titaniferous material dissolved in sulfuric acid in step (a) prior to step (i) is hydrous titanium doxide produced by the hydrolysis of a solution obtained by the digestion of an iron-containing titaniferous material in sulfuric acid to give a solid titaniferous hydrolysis product, and thereafter dissolving the titanium values from said solid hydrolysis product in aqueous sulfuric acid and separating undissolved solids from the resulting solution.

3. A process in accordance with claim 1 wherein the temperature in step (i) is in the range of about 60° C. up to the boiling point of the solution.

4. A process in accordance with claim 1 wherein the aqueous sulfuric acid added in step (ii) has a concentration in the range of 40% to 60% by weight and is added in a volume of about ⅒ to 4 times the volume of said solution.

5. A process in accordance with claim 1 wherein the solution resulting from step (ii) is maintained at a temperature in the range of about 60° C. to about 90° C. until precipitation of titanyl sulfate is essentially complete.

6. A process in accordance with claim 1 wherein the solution from step (a) which is treated in step (i) is prepared by mixing the oxidic titaniferous material with sufficient aqueous sulfuric acid to provide an acid-to-titanium dioxide ratio in the range of 1.5 to 5, heating the mixture at a temperature in the range of from about 60° C. up to the boiling point of the mixture until substantially all of the oxidic titaniferous material is dissolved and adjusting the acid concentration of the solution to a value in the range of 550 to 750 grams of acid per liter.

7. A process in accordance with claim 6 wherein up to 10% by weight, based on the titanium content of the solution expressed as $TiO_2$, of titanyl sulfate seed crystals are added to the aqueous titanyl sulfate solution in step (i).

8. A process for producing titanium dioxide of substantially reduced contamination from oxidic titaniferous materials contaminated by at least one material of the group consisting of chromium, vanadium, niobium and iron impurities, which process comprises the steps of:
    (a) slurrying said oxidic titaniferous material with from about ⅓ to ⅙ its weight of water;
    (b) adding to the slurry of step (a) sufficient sulfuric acid to provide an acid-to-titanium dioxide ratio in the mixture in the range of 1.5 to 5;
    (c) heating the mixture of step (b) at a temperature in the range of from about 60° C. up to the boiling point of the mixture until substantially all of the oxidic titaniferous material is dissolved to provide an aqueous titanyl sulfate solution;
    (d) adjusting the acid concentration in the solution of step (c) to a value in the range of 550 to 750 grams of acid per liter of solution;
    (e) separating undissolved solids from the aqueous titanyl sulfate solution of oxidic titaniferous material;
    (f) adding up to 10% by weight (based on the titanium content of the solution expressed as $TiO_2$) of titanyl sulfate seed crystal to the aqueous titanyl sulfate solution;

(g) heating the aqueous titanyl sulfate solution to maintain it at a temperature in the range of from about 60° up to the boiling point until precipitation of titanyl sulfate is initiated;

(h) adding aqueous sulfuric acid having a concentration in the range of 40 to 60% by weight to the heated solution of step (g) in a volume amount of about 1/10 to 4 times the volume of said solution;

(i) maintaining the temperature of the solution from step (h) at a temperature in the range of 20° C. to 120° C. until precipitation of titanyl sulfate is essentially complete;

(j) separating the precipitated titanyl sulfate from the mother liquor;

(k) redissolving the precipitated titanyl sulfate from step (j) in aqueous liquid to provide a fresh aqueous solution of titanyl sulfate of substantially reduced contamination;

(l) adding sufficient sulfuric acid to the solution of step (k) to provide an acid-to-titanium (as $TiO_2$) ratio in the range of 1.5 to 2.5;

(m) hydrolyzing the titanyl sulfate solution from step (l) to form hydrous titanium dioxide; and (n) recovering and calcining said hydrous titanium dioxide.

9. A process in accordance with claim 8 wherein the oxidic titaniferous material treated in step (a) is hydrous titanium dioxide produced by the hydrolysis of a solution obtained by the digestion of an iron-containing titaniferous material in sulfuric acid to give a solid titaniferous hydrolysis product and thereafter dissolving the titanium values from said solid, hydrolysis product in aqueous sulfuric acid and separating undissolved solids from the resulting solution.

10. A process in accordance with claim 8 wherein the acid concentration of step (d) is adjusted to 650 to 700 grams per liter.

11. A process in accordance with claim 8 wherein the temperature in step (i) is maintained in the range of about 60 to about 90° C.

12. A process in accordance with claim 8 wherein a portion of the titanium in the solution formed in step (k) is reduced to the trivalent state to provide a solution for hydrolysis step (m) containing in the range of about 0.3 to 2 grams per liter of trivalent titanium (expressed as $TiO_2$).

13. A process in accordance with claim 8 wherein there is added to the hydrous titanium dioxide of step (m) for calcining in step (n) at least one precalcination addition selected from the group consisting of the zinc, antimony, tin, potassium, sulfate and phosphate conditioning agents.

14. A process in accordance with claim 8 wherein the acid-to-titanium dioxide ratio in step (b) is in the range of 1.5 to 3.0, the acid concentration in step (d) is adjusted to 650 to 700 grams per liter, the sulfuric acid introduced in step (h) has a concentration in the range of 45 to 55% by weight and is added in a volume amount of about 1 to 2 times the volume of solution, the aqueous titanyl sulfate solution in step (i) is heated to a temperature in the range of about 60 to 90° C., the separated precipitate from step (j) is washed with a member selected from the group consisting of acetone and aqueous sulfuric acid prior to step (k), the acid-to-titanium ratio in step (l) is adjusted to a value in the range of 1.7 to 2.0 and is concentrated to provide a titanium content (expressed as $TiO_2$) in the range of about 150 to 375 grams per liter.

References Cited

UNITED STATES PATENTS

| | | | |
|---|---|---|---|
| 2,121,215 | 6/1938 | Weise et al. | 23—202 |
| 2,143,530 | 1/1939 | Allan | 23—202 X |
| 2,237,764 | 4/1941 | McKinney | 23—202 |
| 2,253,551 | 8/1941 | Booge | 23—202 X |
| 2,298,032 | 10/1942 | Bousquet et al. | 23—202 X |
| 2,344,553 | 3/1944 | Loth et al. | 23—202 |
| 2,766,133 | 10/1956 | Marcot et al. | 23—202 X |
| 2,849,289 | 8/1958 | Zirngibl et al. | 23—202 X |
| 2,999,011 | 9/1961 | Olmstead et al. | 23—202 |
| 3,060,002 | 10/1962 | Leddy et al. | 23—202 |
| 3,071,439 | 1/1963 | Solomka | 23—202 |
| 3,091,515 | 5/1963 | Dantro et al. | 23—202 |
| 3,218,131 | 11/1965 | Grose | 23—202 |

OSCAR R. VERTIZ, *Primary Examiner.*

EDWARD STERN, *Examiner.*